Dec. 8, 1942. C. H. BRINTON 2,304,146
FEEDING AND SERVING MECHANISM
Filed July 19, 1940 8 Sheets-Sheet 1
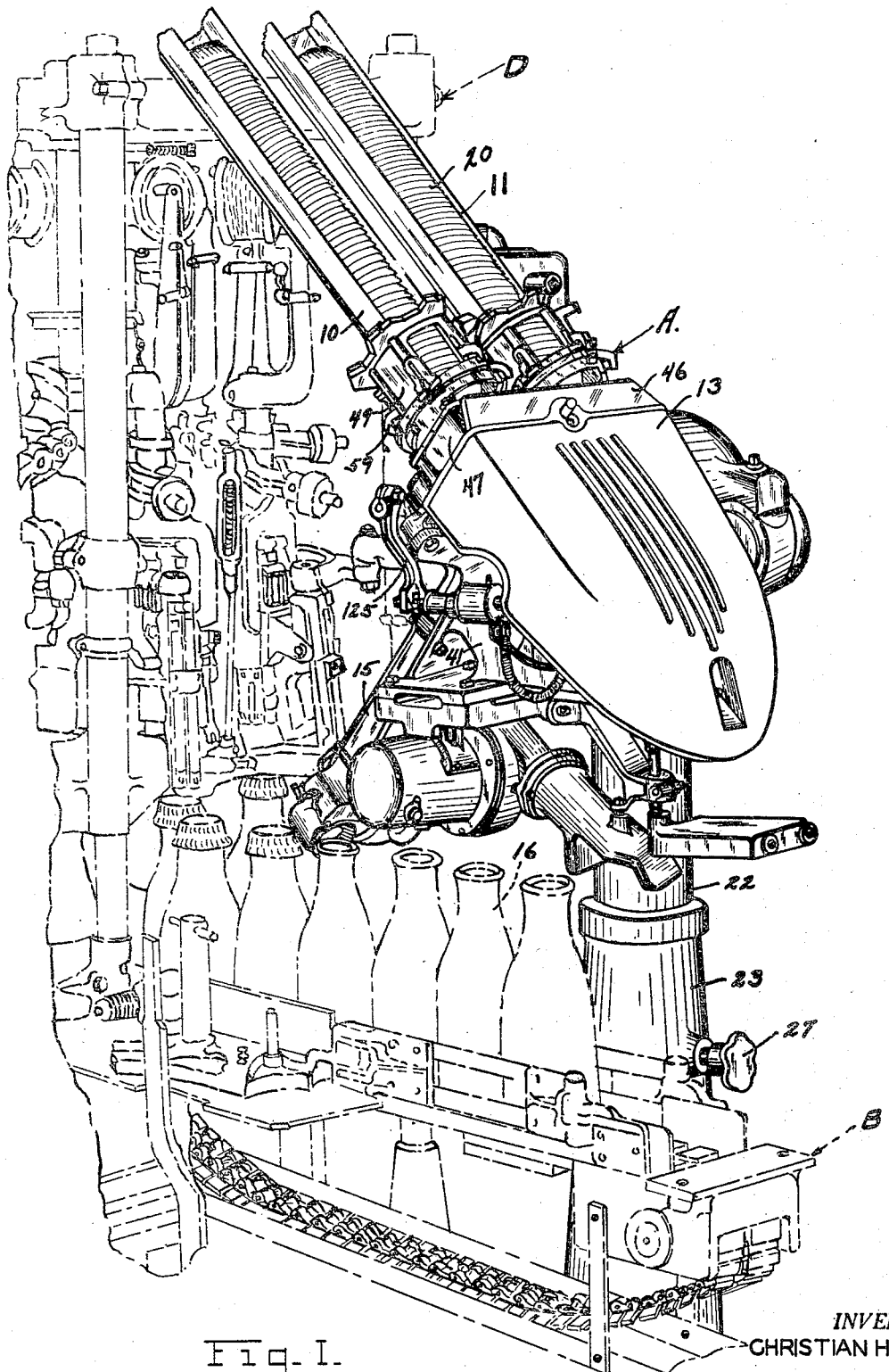
Fig. I.
INVENTOR.
CHRISTIAN H. BRINTON.
BY *Joseph B. Lindecker*
ATTORNEY.

Dec. 8, 1942.     C H. BRINTON     2,304,146
FEEDING AND SERVING MECHANISM
Filed July 19, 1940     8 Sheets—Sheet 2
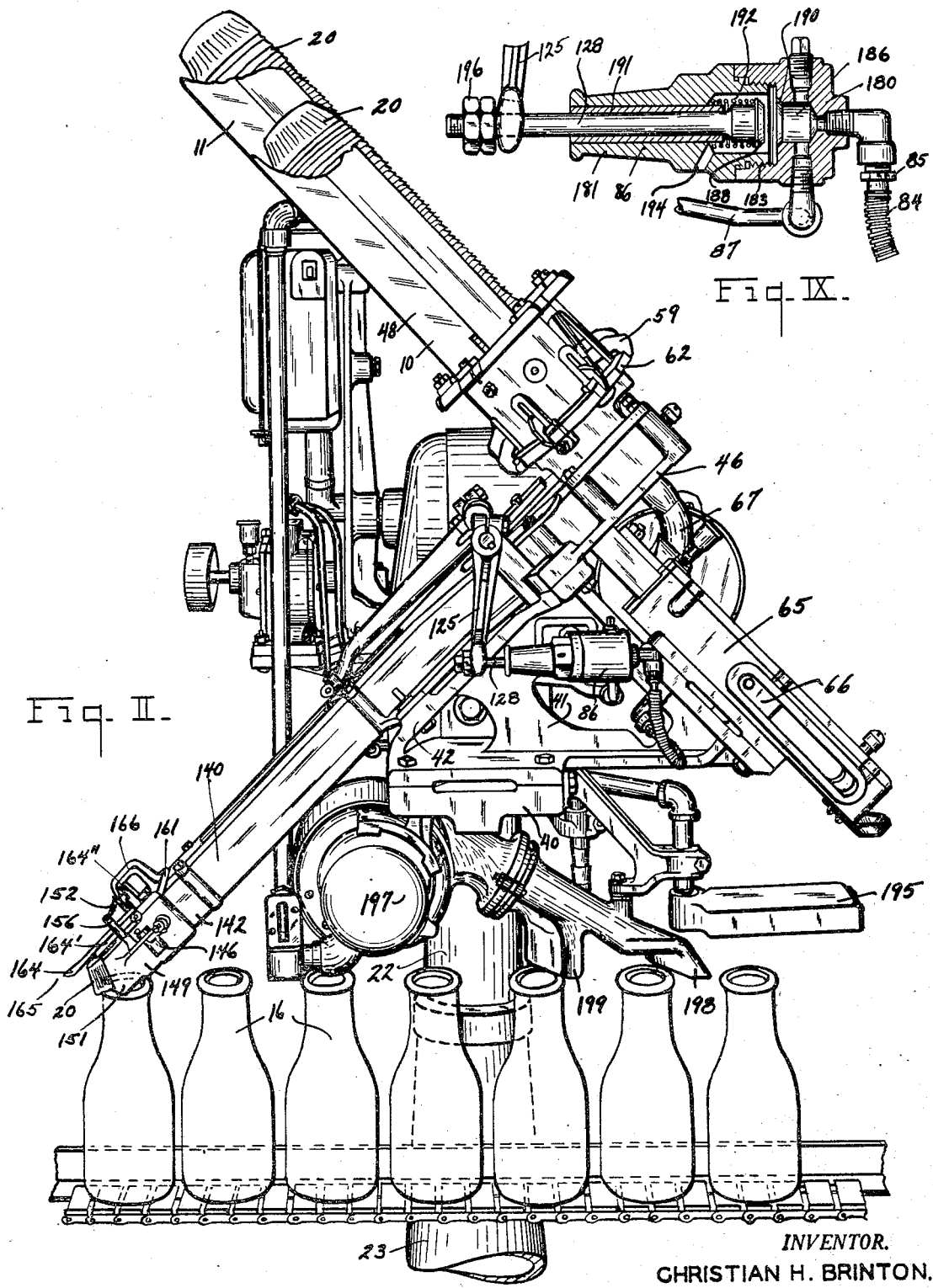
INVENTOR.
CHRISTIAN H. BRINTON.
BY Joseph B. Lindecker.
ATTORNEY.

Dec. 8, 1942.  C H. BRINTON  2,304,146
FEEDING AND SERVING MECHANISM
Filed July 19, 1940  8 Sheets-Sheet 3
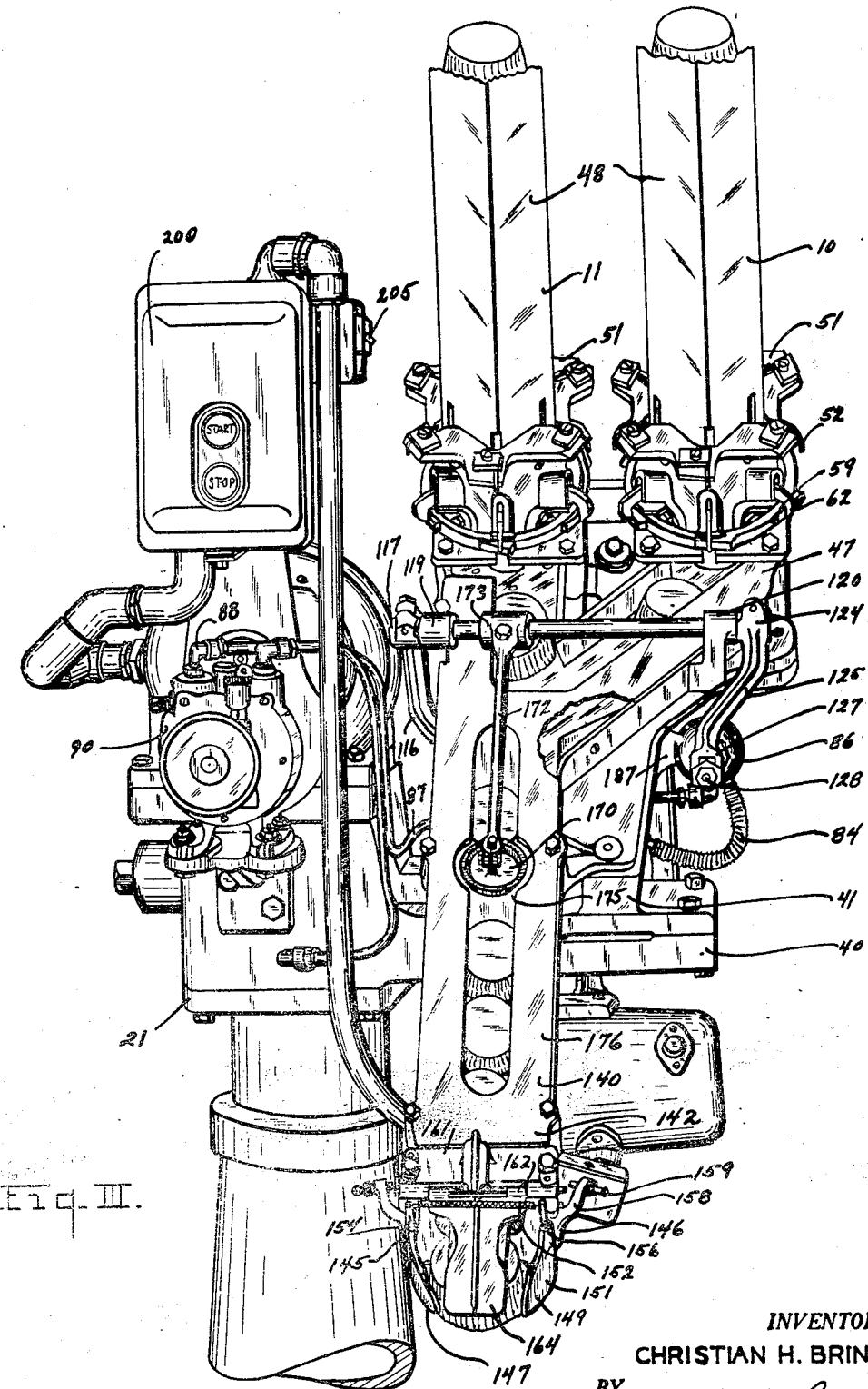
Fig. III.
INVENTOR.
CHRISTIAN H. BRINTON.
BY
Joseph B. Lindecker
ATTORNEY.

Dec. 8, 1942.   C. H. BRINTON   2,304,146
FEEDING AND SERVING MECHANISM
Filed July 19, 1940   8 Sheets—Sheet 4
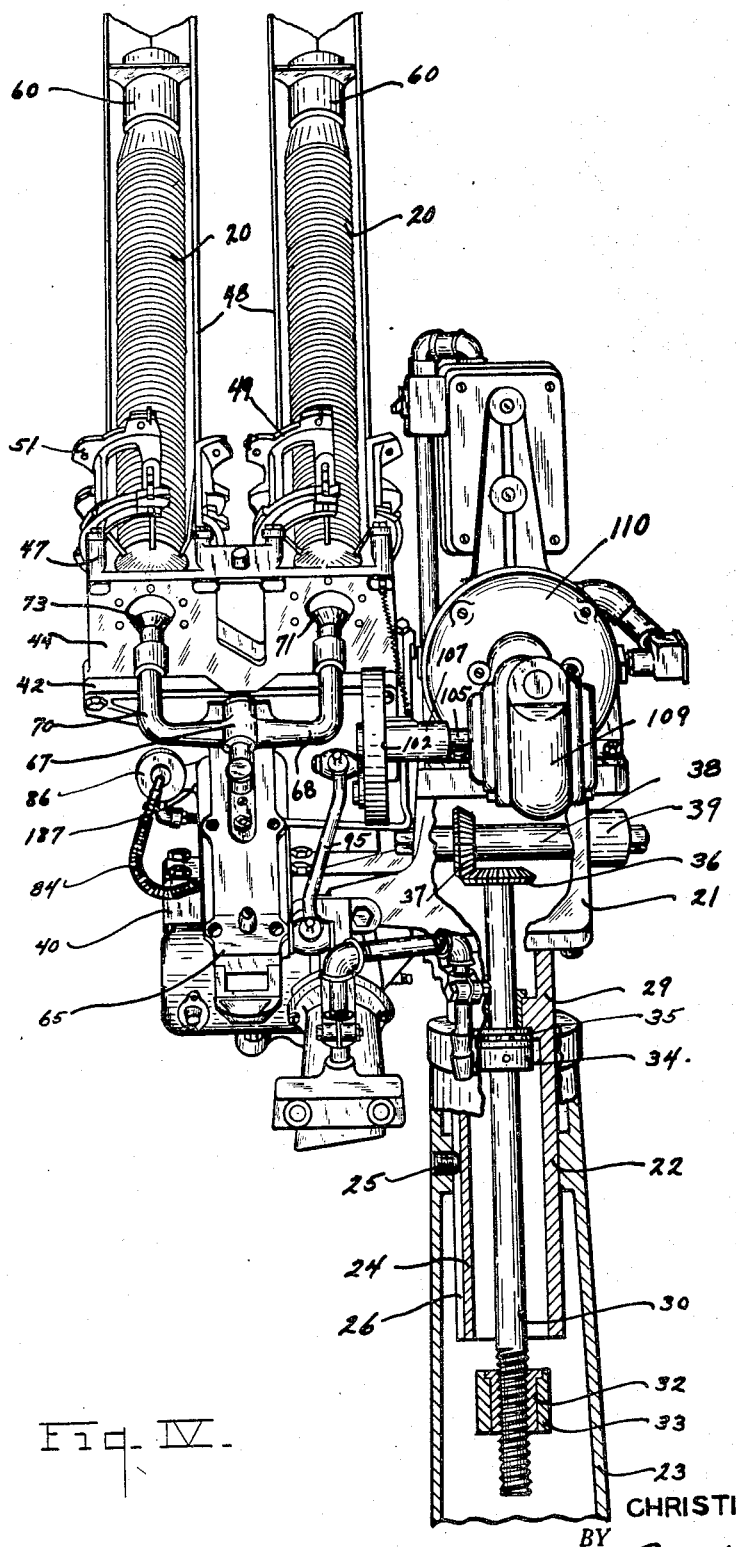
Fig. IV.
INVENTOR.
CHRISTIAN H. BRINTON.
BY
Joseph B. Lindecker
ATTORNEY.

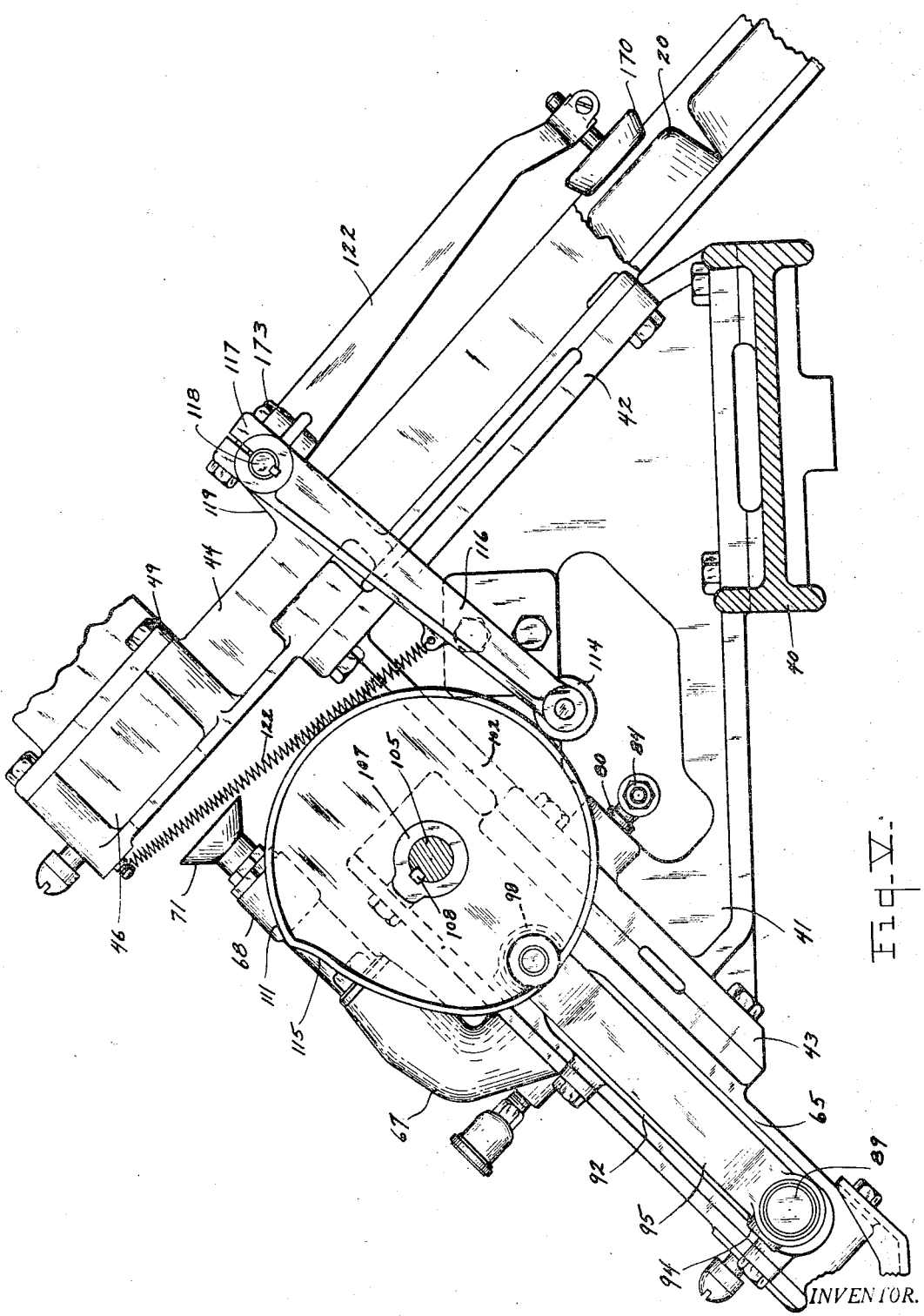

Dec. 8, 1942.     C H. BRINTON     2,304,146
FEEDING AND SERVING MECHANISM
Filed July 19, 1940     8 Sheets-Sheet 6
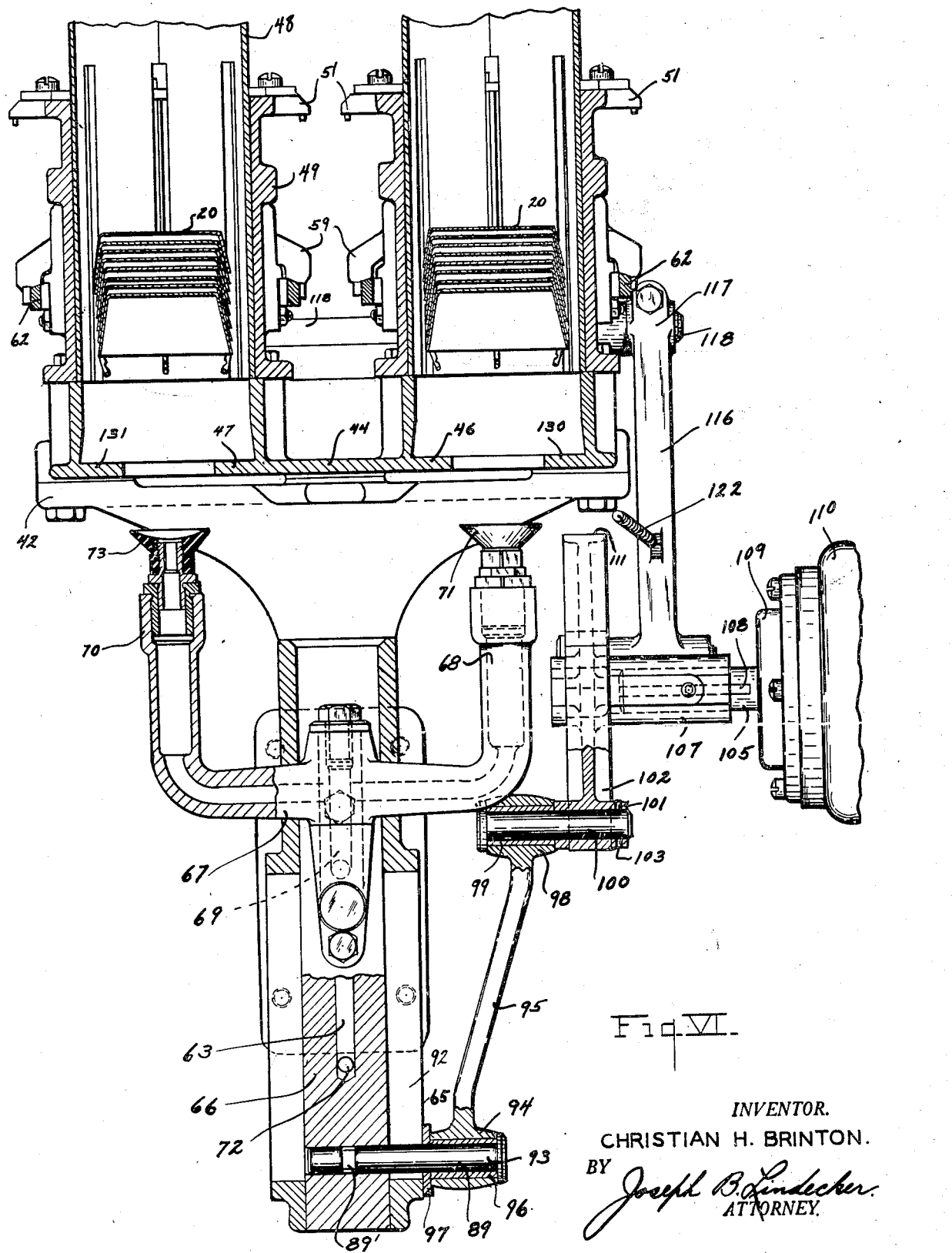
Fig. VI.
INVENTOR.
CHRISTIAN H. BRINTON.
BY Joseph B. Lindecker
ATTORNEY.

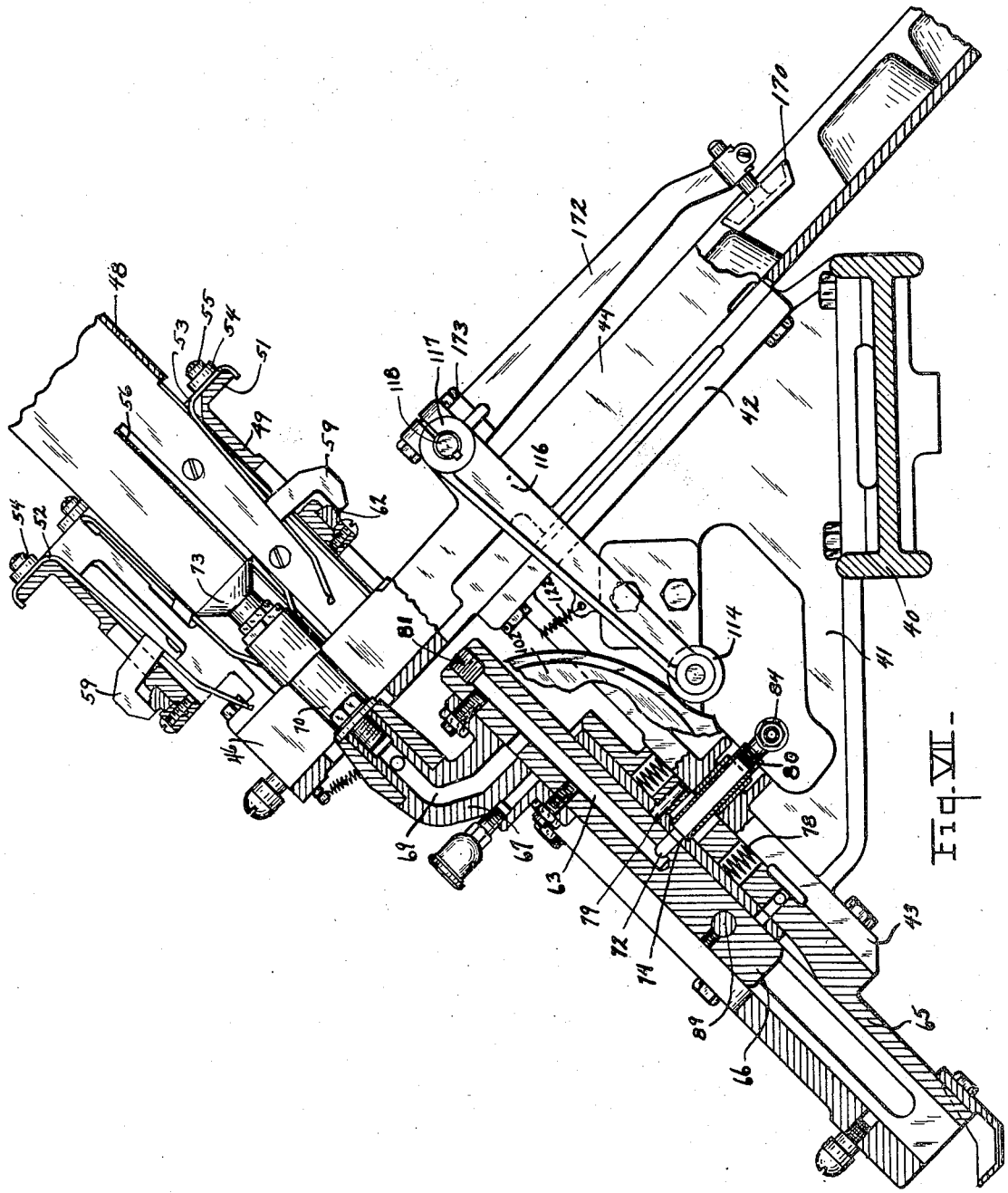

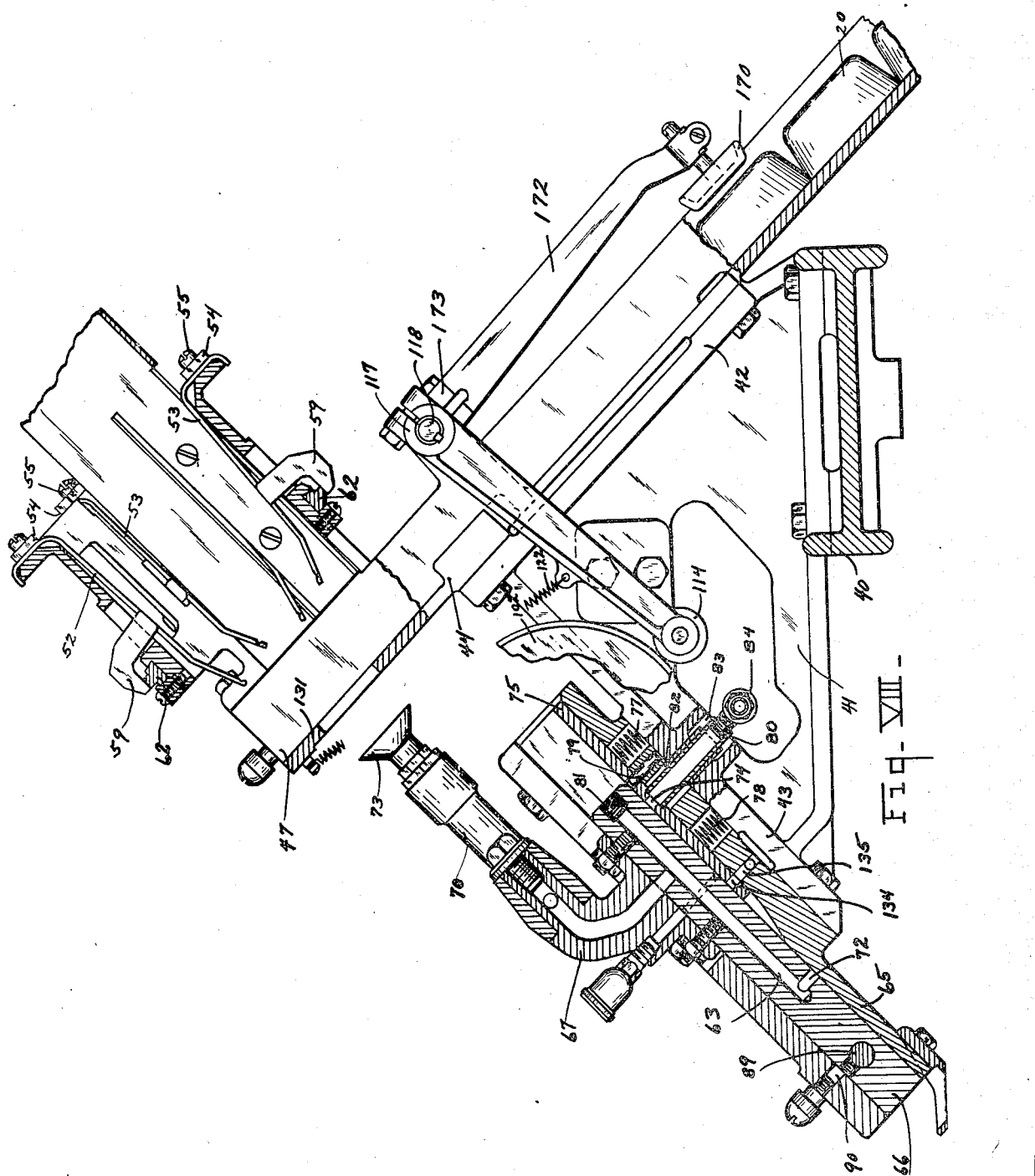

Patented Dec. 8, 1942

2,304,146

UNITED STATES PATENT OFFICE 2,304,146

FEEDING AND SERVING MECHANISM

Christian H. Brinton, Oak Park, Ill., assignor to Standard Cap and Seal Corporation, Chicago, Ill., a corporation of Virginia Application July 19, 1940, Serial No. 346,391

20 Claims. (Cl. 226—88.1)

This invention relates to mechanisms for feeding and delivering objects, and particularly to a mechanism having an improved means for rapidly and efficiently transporting objects or closures to a point where the same are applied to containers, such as mouths of bottles.

The invention includes as one of its principal objects improved means for simultaneously removing with certainty and rapidly transferring to a serving device having a single point of application a plurality of objects or closures for containers from a plurality of independent objects or closures retaining means.

The invention comprehends as one of its objects the coordination of a simultaneously actuated multiple feeding device with a plurality of independent objects retaining means so as to simplify the loading of the retaining means decreasing the labor and time consumed in such operation.

The invention contemplates as one of its objects a novel arrangement of a transferring means for concurrently withdrawing from a means retaining independent supplies of articles such as caps or closures a plurality of said articles in association with means for securing that said plurality of articles will be guided in proper alternate sequence to a single serving outlet for application to bottles or other containers.

The invention embraces as one of its objects a mechanism including a new form of multiple feed which is not only simple in construction and inexpensive to manufacture but which also insures a steady and continuous delivery of closures or objects from a multiple source of supply to a common serving device.

The invention also contemplates as one of its objects a novel mechanism adapted for joint operation with other mechanisms for the purpose of efficiently and without interruption performing timed steps in filling and sealing containers or receptacles such as milk bottles.

The invention also embraces as one of its objects a mechanism in which the supplying and transferring of the closures to the delivery chute is dependent upon the withdrawal of a closure from said delivery chute.

The invention further contemplates as one of its objects improved commonly actuated feeding means that are rendered ineffective by the presence of a predetermined number of closures or caps in the serving device and which will become effective upon the disposition of one or more closures from the serving device.

A further object of the invention resides in the provision of a machine of this character which is adapted and readily adjustable for use in feeding and applying closures to various types and sizes of bottles.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure I is a perspective view of a form of machine or apparatus of the invention, shown for adoption in use with, for example, a bottle sealing machine, which latter machine is shown in outline;

Figure II is a side view of the closure or cap applying mechanism shown in Figure I;

Figure III is a front view of the mechanism shown in Figure I;

Figure IV is a rear perspective view of the capping mechanism, the guard being removed to show the multiple feeding mechanism;

Figure V is a side elevational view of the dual feeding mechanism shown in Figure IV with portions of the serving chute broken away for purpose of illustration;

Figure VI is an enlarged detail view of the feeding mechanism shown in Figure IV, with portions in section for purpose of illustration;

Figure VII is a side view of the dual feeding mechanism of my invention in cap engaging position, a portion illustrated in section and a portion of the delivery chute broken away.

Figure VIII is a side view similar to Figure VII showing the feeding mechanism in its retracted position with portions illustrated in section and a portion of the delivery chute broken away;

Figure IX is a fragmentary detail sectional view of the vacuum connecting mechanism in its ineffective position to the feeding mechanism.

The principles and features of the present invention are shown in the drawings as embodied in a mechanism particularly adapted for use in feeding and serving or applying skirted caps or closures which may be of paper, fiber or other suitable material to milk bottles or other containers, but it is to be understood that the mechanism may be varied widely still retaining the principles and features herein indicated, the invention being susceptible of use with any mechanism where it is desired to selectively or periodically feed and deliver objects, and that the embodiment herein shown and described, is illustrative only of one use to which this invention may be utilized.

Referring to the drawings in detail, particularly to Figures I and II, the device of my invention A is shown in association with a milk bottle conveying mechanism B and a closure sealing machine D shown in dotted lines. The device of the invention is preferably constructed as a portable and adjustable unitary structure including a multiple closure retaining means or magazines 10 and 11, a closure feeding or withdrawing mechanism located within cover or guard 13 and a closure serving device 15. The latter adapted to apply the closures to the milk bottles 16 moved by the conveyer B.

Carried on a pedestal or frame member 21 secured to the top to a vertically movable standard or post 22 as an adjustable unitary structure are the magazines for retaining the independent supplies of closures 20, the feed-mechanism, the serving chute and associated instrumentalities of the invention. The post 22 which is preferably of hollow cylindrical configuration closed at its upper end is adapted to slide in the tubular supporting pillar or base member 23. The lower cylindrical section 24 of post 22 is provided with a groove 26 into which projects a member 25 carried by pillar 23 which checks the rotation of member 22 but permits its vertical movement. The post 22 is locked in place by locking means 27.

The means for adjusting the unitary structure of the invention (as particularly shown in Fig. IV) comprises a screw shaft 30 journalled adjacent to its upper extremity on the closed end 29 of the member 22 and having its intermediate section in threaded engagement with a threaded bushing 32 supported by inwardly projecting walls or webs 33 forming a part of the supporting pillar 23. The shaft 30 is provided with a fixed collar 34 which supports an anti-friction bearing 35, the latter adapted to contact with the inner surface of the end 29 of the tubular member 22 to absorb the thrust set up by the weight of the structures carried by the pedestal 21. Fixed to the upper end of the shaft 30 is a bevel gear 36 meshing with a gear 37, the latter fixed upon one end of a stub shaft 38 journalled for rotation in hub portions 39 forming integral parts of the frame 21, the outer extremity of the stub shaft 38 being squared or otherwise formed to receive an operating crank.

In the embodiment illustrated rotation of the stub shaft 38 and corresponding rotation of shaft 30 through the gears 36 and 37 will elevate or lower the pedestal 21 and the unitary structure carried thereby with respect to the conveyer mechanism B, this adjustment being particularly advantageous in rendering the mechanisms carried by the frame or pedestal 21 adaptable for use in capping bottles or containers of various heights.

The arm or ledge 40 preferably forming an integral part of frame 21 fixedly supports a bracket 41 of triangular configuration carrying on its inclined surface 42 the base member or casting 44 of Y-formation and of channel shaped cross section forming a component element of the cap delivery chute 15. On the upper surface of each of arms 46 and 47 of member 44 rest the cap retaining means 10 and 11 in inclined relation.

The magazines 10 and 11 are particularly illustrated in Figures I to IV and VI wherein it can be seen that they are similar in construction each comprising a channel shaped member or retaining chute 48 having their web section of V-shaped formation at their side walls substantially parallel. The lower extremity of each of the channel members 48 is surrounded by irregular shaped sleeve-like members 49 the base of which is fixedly secured to the upper surface of the arms 46 and 47. The sleeves 49 are provided with an outwardly projecting flange 51 upon which are fixed in spaced relation a plurality of resilient fingers 52 and 53, by means of clamps 54 held in place by screws 55. The fingers 52 and 53 project inwardly through suitable slots 56 formed on the channel shaped members 48 and are preferably of different lengths their ends flaring inwardly and having serrated extremities adapted to engage the caps or closures in each of the channel members 48. Each of the resilient fingers 52 and 53 is provided at its intermediate portion with a hook-like member or finger stop 59 adapted to project outwardly through the slots 56 and the registering slots 57 provided on sleeves 49.

The tension or inherent flexure in the fingers 52 and 53 serves to urge them to their innermost position toward the axis of movement of the caps 20, the inward movement of the fingers being limited by means of an adjustable camming ring-like member 62 carried on the outer surface of the sleeves 49 which is in engagement with the finger stops 59. To adjust the innermost movement of the fingers 52 and 53 it is only necessary to rotate the camming member 62 to urge the fingers outwardly through the medium of hook-like members 59 in contact therewith so as to change their relative position within the members 48. The difference in lengths of fingers 52 and 53 serves a very important function in the proper withdrawing of caps from the supplies as the cap next to be delivered is in engagement with the longest finger 52, while finger 53 will engage the next succeeding cap to prevent the withdrawal of more than one cap from the magazines.

The caps designated 20 are positioned in nested formation as particularly illustrated in Figures I and IV, the uppermost cap being engaged by a weight 60 preferably of cylindrical configuration having a guiding member 61 engaging the edges of the channel 48 to prevent rotation of the caps 20, but serving to force the caps downwardly into engagement with the cap withdrawing or feeding mechanism.

I have provided novel and effective mechanism for periodically and simultaneously withdrawing caps from the magazines 10 and 11 to be concurrently deposited on the inclined serving chute 15. The withdrawing mechanism is particularly shown in Figures V to VII on the drawings, and comprises a rectangular shaped hollow housing 65 supported on the inclined surface 43 of bracket 41 and which is adapted to receive for movement therein a reciprocable member of slide bar 66. The slide bar 66 carries on its upper surface a member 67 having a pair of interconnected spaced hollow plungers 68 and 70 which project through the upper wall of the housing 65. The plungers 68 and 70 are in axial alignment with the magazines 10 and 11 carrying at their ends suitable fittings for removably supporting conically or cup shaped hollow flexible members 71 and 73 adapted to engage the caps 20, preferably formed of rubber or other suitable distortable material. Each of the cup-shaped members through the hollow plungers is in communication with the bore 69 of member 67, the latter being connected to the central axial passage or bore 63 provided in the reciprocable slide bar 66 which is closed at its upper end by a plug member 81 and which terminates at its other end in a transverse opening 72 formed on the lower surface of the slide bar 66. The opening 72 is adapted for periodic registration with an opening 74 formed on the plate or sealing strip 75, the latter urged into engagement with the slide bar 66 by means of springs 77 and 78 and being locked against lateral displacement by pin 79. Secured to plate 75 in registration with opening 74 is a conduit 80 which projects through registered openings 82 and 83 formed on the housing 65 and the inclined wall 43 of bracket 41. The lower end of the conduit 80 is in threaded engagement with a suitable flexible tube 84 having its other end 85 connected to a control connecting valve 86 which in turn is connected by means of conduit 87 to the inlet port 88 of a vacuum pump 90.

The slide bar 66 is provided adjacent to its lower extremity with a transversely extending shaft 89 pinned or otherwise secured as at 89' which projects through an elongated opening 92 formed on the side wall of the housing 65. Adjacent to the enlarged extremity 93 of shaft 89 is journalled the lower end 94 of the pitman or connecting link 95 carrying a bearing 96 preferably of suitable anti-friction material and having contact with a spacing washer 97 which engages the side walls of the housing 65 adjacent to the elongated opening 92. The upper end 98 of pitman 95 carries a suitable bushing or bearing 99 journalled upon a crank pin 100 fixedly carried on an excentrically located boss 101 of the rotatable cam member 102 by means of a pin 103.

The cam 102 is fixedly secured to at one end of the shaft 105 by means of the sleeve 107 forming an integral part of the cam member by means of a key 108. The shaft 105 forms part of a suitable gear reduction mechanism 109 directly connected at one end of the shaft of the electric motor 110 constituting the common source of power for the vacuum pump 90 and the reciprocating member or slide bar 66 and cap withdrawing means carried thereby.

Referring to Figure V it can be seen that the peripheral surface 111 of the timing cam 102 coacts with the cam engaging roller 114 carried at one end of the arm 116 fixed at its other end 117 to the transversely extending shaft 118, the latter journalled on bearings provided on the uprights 119 and 120 carried by the casting 44 of the receiving chute 15. The cam roller 114 is urged in contact with the cam surface 111 by means of a retractile spring 122 connected to the arm 116. The shaft 118 fixedly carries adjacent to the upright 120 the end 124 of arm 125 the other end of which is formed with an elongated opening 127 adapted to accommodate the valve stem 128 of the communicating valve mechanism 86 which operates to control the vacuum connection between the inlet port 88 of the vacuum pump 90 and the conduit 80 to the flexible cap engaging members 71 and 73.

I have provided means to cause the lowermost cap of each of the magazines 10 and 11 to simultaneously adhere to the flexible cup members 71 and 73 when the same are in the uppermost position, that is the position shown in Figure VII so that when a downward movement is imparted to the cup members by the crank arm 95, the caps will be carried past the fingers 52 and simultaneously deposited on each of the arms 46 and 47 of the serving chute 15. To this end the suction side 88 of the pump 90 or other means to produce a normally reduced pressure are communicated to the flexible members 71 and 73 when the same take the uppermost position. This communication is established due to the registration of the opening 74 of sealing strip 75, which through the vacuum control mechanism 85 is normally connected to the suction side of pump 90, with the transverse opening 72 of slide bar 66 connected to the flexible members 71 and 73 producing a partial vacuum or normally reduced pressure between the cup members 71 and 73 and the surface of the caps engaged thereby causing the caps to forcibly adhere to the flexible members so that when the latter are moved downwardly the caps will be carried past the fingers 52 to a position where the lowermost portion of the caps will engage the upper surfaces 130, 131 of each of arms 46 and 47. The arrangement of the parts is such that when the caps are in engagement with the surface 130 or 131 of the arms 46 and 47 the opening 72 of the slide bar 66 is in registration or communicates with a vent opening 134 provided in the wall of the sealing strip 75 to the atmosphere through the passage 135 on the lower wall of the housing 65 so that the partial vacuum or reduced pressure in the members 71 and 73 is simultaneously raised to atmospheric, the equalization of pressure and the inclination of the arms 46 and 47 will produce an automatic release or disengagement of the caps from the flexible members 71 and 73 depositing the caps concurrently on each of the arms 46 and 47 of the serving chute 15.

The channel shaped arms 46 and 47 are of different length, the arm 46 being in substantial alignment with the outlet conduit 140 while the arm 47 is angularly displaced with respect to said conduit. The inclination of the arms 46 and 47 is such that of the simultaneously deposited caps, the one deposited on the arm 46 moves at a higher speed than that deposited on the arm 47 so that the caps are guided and move in proper alternate sequence to the single outlet conduit 140 and hence to the point of application or serving outlet 142 for application to the mouths of the bottles or containers 16.

The means to effect the proper application of a cap from the single serving outlet 142 to the mouth of the bottle 16 is particularly shown in Figure III in which it can be seen that the lower extremity of serving outlet 142 is enlarged and the side walls pivotally carry as at 145 and 146 the wing like members 147 and 149 each having curved portions 151 which are adapted to engage a neck portion of the bottle 16 as the same passes under the cap applying outlet. The wing like members or curved fingers 147 and 149 are preferably held in their innermost position by means of a coil spring 152, the ends of which are suitably secured to posts 154 and 156 carried by each of the wing like members. The spring 152 serves to urge the wing like members into contact with the skirt of the bottle caps but permits a release when the same are engaged by the moving bottles. Each of the wing like members are provided with an arm 158 carrying a regulating screw 159 acting as stop means for the outward movement of the curved fingers or wing like members.

The upper end of each of the side walls adjacent to the lower extremity of the conduit 142 is adapted to support an adjustable transverse plate 161 upon which suitably pivoted as at 162 is a vertically movable or levelling finger 164 having its forward extremity 165 substantially horizontal and projecting beyond the end of the fingers 147 and 149. The motion of the levelling finger 164 is limited in its downward movement by a stop plate 164' which is also pivoted as at 162, said plate 164' having a vertical portion 164'' which governs the downward movement of said plate 164' by having said vertical portion come in contact with member 166 of hook like configuration adapted to engage the upper portion of said vertical member 164''.

I have provided means whereby the simultaneous withdrawing of the caps from the magazines 10 and 11 and the simultaneous delivery to the serving chute arms 46 and 47 will be interrupted when there is a predetermined number of caps in the serving outlet conduit 142, a condition which may arise by reason of the fact that the number of bottles 16 traveling in the conveyor B are insufficient in number to withdraw the caps fed into the serving outlet 142 as rapidly as the feeding mechanism normally transfers the caps to the arms 46 and 47. To this end the application of a partial vacuum or a normally reduced pressure to the flexible cups 71 and 73 is interrupted or rendered inoperative through the medium of a cap contacting pad 170 adjustably supported upon the end of the arm 172 having its end 173 fixedly secured to the shaft 118. The pad 170 is adapted to project through a suitable opening 175 formed on the cover 176 which closes the channel shaped conduit or serving outlet 142. As hereinbefore pointed out, the shaft 118 carries the valve operating arm 125 which is connected to the valve stem 128 of the valve mechanism 86 which establishes a connection between the suction side of the pump 90 through the flexible conduit 84 to the flexible members 71 and 73 when the same are in their uppermost position.

As illustrated in Figure VIII when the conduit 142 is filled with caps 20 so as to cause the pad 170 to engage the upper surface of one of the caps retained therein, the valve controlling lever 125 through the adjustable stop or threaded nut will operate the valve stem 128 to its open position so as to render the connection between the vacuum pump and the flexible fingers 71 and 73 ineffective.

The valve mechanism 86 which controls the connection for the application of a partial vacuum or a normally reduced pressure compared with atmospheric pressure to the flexible cups 71 and 73, when the same are in their uppermost position contacting with the cap next to be delivered from the magazines to forcibly carry them past the fingers 52 when the plungers and cups are moved downwardly is shown in Figure IX. The valve mechanism 86 includes a cup shaped member 180 and a tapering hollow member 181 having threaded engagement with member 180 as at 183 thus forming a housing for a poppet valve. The cup shaped member is supported by a suitable bracket 187 to the stationary support 41 and forms an open ended chamber 186 to which are connected the end 85 of the flexible tube or conduit 84 and one end of the conduit 87 which has its other end connected to the suction side or port 88 of the vacuum pump 90 or suitable means for producing a normally reduced pressure. The open end of chamber 186 is closed by means of valve head 188 adapted to engage a valve seat 190. The valve head 188 is slidably carried by its valve stem 128 on the bushing 191 fixed to the central bore of hollow member 181 and is urged into engagement with the valve seat 190 by means of a coil spring 192 interposed between the surface 193 and the inner surface of the valve head 188. The hollow member 181 is provided with an opening 194 which serves to establish a connection between the chamber 186 and the atmosphere when the valve head 188 is in its retracted position as shown in Figure IX, but which is shut off when the valve head 188 is in engagement with the valve seat 190 under the influence of spring 192. The action of spring 192 to close the chamber 186 by valve head 188 is neutralized when the stem 128 is moved outwardly through the adjustable stop or threaded abutment 196 by the valve operating arm 125 due to the movement imparted to the shaft 118 caused by the engagement of roller 114 with timing cam 102, the engagement of pad 170 of arm 172 fixed thereto with a cap in the serving conduit 142 causes the cam engaging roller to be held out of engagement with the timing cam 102.

In the embodiment of the invention illustrated, the means to produce a source of normally reduced pressure creating a partial vacuum as compared with atmospheric pressure for rendering by its application the cap withdrawing means effective is in the form of a constantly actuated suction pump 90 carried by the frame 21 which is rotated through a suitable gearing not shown, the latter connected to the shaft of the electric motor 110 which also operates the reciprocating carrier or slide bar 66 of the cap withdrawing mechanism. However, it is to be understood that any suitable pneumatic means operable to cause the hood caps 20 to forcibly adhere to the suction cups 71 and 73 is contemplated.

Means are provided to retain the mouth as well as the neck of the bottles sanitary and prevent germ contamination prior to the application of a hood cap to the mouth of bottles that have been filled and disc capped. These means are located in spaced relation to the serving chute delivery outlet so that their operation is performed during the transfer of the bottles to the serving outlet by the conveying mechanisms and include the spray nozzle or wash unit 195 which serves for spraying and washing the mouth and neck of the bottle in association with means to accelerate the drying operation by blowing heated air thereto through the use of a blower motor 197 provided with suitable heater coils having spaced outlets 198 and 199. The blower motor 197 and wash unit 195 are suitably supported on the lower surface of the arm 40 so that the same are moved concurrently with the magazines, feeder mechanism and cap serving chute when movement is imparted to the post 22.

I have provided a control or switching mechanism 200 for closing and opening the circuits of the motor 110. I have provided a switch 205 for closing and opening the circuits of the blower motor 197 as well as the heater coils associated therewith.

While the operation of the mechanism will be clear from the foregoing description the same may be summarized as follows: The actuation of the switch mechanisms 200 and 205 by the operator to a position to close the circuits will not only start the electric motor 110 but also the blower motor 197 so that each of the bottles already filled and disk capped which are moved by the conveying mechanism toward the serving chute 15 is prior to the engagement of the mouth of the bottle with the cap stop gates or wing-like members or fingers 147 and 149 successively sprayed by the water nozzle 195 and dried by blowing air thereto through the blower motor outlets 198 and 199.

Movement of the conveyor mechanism B will carry the bottle past the blower motor outlet 199 to a position wherein the forward upper portion of the neck or bottle mouth will engage the inner surface of the skirt or depending portion of the hood cap 20, forward movement of the bottle will carry the hood cap past the wing-like members 147 and 149 causing the horizontal portion 165 of the leveling finger 164 to press the upper flat portion of the hood cap over the bottle mouth thus completing the cap applying operation. It is to be understood that the motor 110 is constantly actuating the vacuum producing pump 90 and reciprocating the suction cups 71 and 73 through the carrier or slide bar 66 and the pitman 95 eccentrically connected to the timing cam 102 which is rotated through the gear reduction mechanism 109 directly connected to one end of the shaft of the electric motor 110, so that when a hood cap is withdrawn by a bottle passing beneath the serving outlet the hood caps in the serving conduit 142 gradually slide downwardly. The downward movement of the caps will allow the pad 170 carried by arm 172 fixed to shaft 118 to gradually move between the caps. The movement of the pad 170 is caused by the rotative action imparted to shaft 118 through the arm 116 fixed thereto produced by spring 122 so that when the roller 114 contacts with the cam dwell 115 the shaft 118 will move the valve timing arm 125 to allow the valve stem 128 to in turn move the valve head 188 under the action of spring 192 to close chamber 186 thus connecting the suction side of pump 90 to the flexible conduit 84 connected to opening 74 of sealing strip 75 so as to establish a connection from the suction side of pump 90 to the carrier or slide bar 66.

The position of the dwell 115 of the timing cam 102 with respect to the location of the eccentrically located crank pin 100 carried thereby is such that when the cam dwell is engaged by the cam riding element 114, the slide bar or carrier 66 reciprocated by the pitman 95 connected to pin 100 is in its uppermost position as particularly illustrated in Figure VII, where it can be seen that there is a registration between slide bar opening 72 and the opening 74 of the sealing strip 75. The opening 74 is connected through conduit 84 and the valve mechanism to the source of reduced pressure 90 so that when the suction cups 71 and 73 contact with the lower face of the hood cap next to be delivered held by the resilient fingers 52, a reduced pressure is applied to the hood cap by the communication set up by the valve mechanism between the source of normally reduced pressure 90 and the suction cups 71 and 73 which will cause the lowermost hood cap of each stack to forcibly adhere to the suction cups producing an extracting engagement. This extracting engagement will serve to carry the hood caps in the downward movement or withdrawing stroke of the carrier 66 past the serrated portions of fingers 52 to a position where the lower edge of the skirt portion is in engagement with the wall sections 130 and 131 respectively of each of the receiving arms 46 and 47 adjacent to the openings on the base of the receiving chute through which the suction cups are moved in their reciprocating movement. Examination of Figure VI clearly indicates each of the openings on the base plate of the arms 46 and 47 is of suitable dimension to allow the passage of the suction cups 71 and 73 but smaller than the diameter of the skirt of the hood caps 20 so that their lowermost edge is engaged by the surfaces 130 and 131 of the base plate of the serving chute 15 adjacent to the openings before the carrier 66 approaches substantially the end of its withdrawing stroke. The base plate of the receiving chute is so arranged that when engagement of the skirts of the hood caps take place with surfaces 130 and 131 the carrier opening 72 is in registration with the vent opening 134 provided on the sealing strip 75 which is connected to the atmosphere so that the partial vacuum or reduced pressure in the suction cups 71 and 73 simultaneously rises to atmospheric pressure by the admission of air thereto. The equalization of pressure and the engagement of the lowermost portion of the cap with the surfaces 130 and 131 of each of the arms 46 and 47 will cause the simultaneous disengagement of the hood caps from the suction cups and the simultaneous deposition of the hood caps in each of the arms 46 and 47. As hereinbefore pointed out, arm 46 is in substantial axial alignment with the delivery conduit 142 while the arm 47 is angularly displaced so that the simultaneously deposited caps are guided to the serving conduit or outlet 142 in proper alternate sequence.

It should be noted that space occupied by cam dwell 115 on the peripheral surface 111 of the cam 102 is such that when the opening 72 is out of registration with the opening 74 the cam roller is moved outwardly imparting rotatable movement to shaft 118 thus moving the valve control lever 125 to operate the valve stem 128 to a position wherein vacuum connecting chamber 186 is open and the suction side 88 of the pump 90 is connected through opening 194 to the atmosphere so that there is no application of reduced pressure to the opening 74.

The foregoing operation is accomplished during the normal cycle. However, when no withdrawal of the caps takes place due to the fact that a bottle has not been moved past the serving chute 15 the caps in the conduit 142 will remain stationary and the pad 170 will contact under the combined action of cam urging roller spring 122 and valve closing spring 192 with the upper surface of a hood cap and prevent the cam roller 114 from engaging the cam dwell 115 holding the valve member 128 in its open position as shown in Figure IX through the valve controlling arm 125 so that no communication is established between the opening 74 and the suction side pump 90 as the pump will be connected to the atmosphere through the opening 194. Therefore, when the carrier or slide bar 66 reaches its upper position to cause the registration of opening 72 with opening 74 and cups 71 and 73 to engage the lowermost hood cap there is no application of a reduced pressure and consequently no extracting engagement between the suction cups and the hood caps to overcome the action of the resilient fingers. In this manner the withdrawing means are rendered ineffective to transport simultaneously a hood cap from each of the magazines 10 and 11 to the serving chute arms 46 and 47.

As shown in Figure I, means are provided to enclose the cap withdrawing and transporting mechanism in the form of a cover 13 as well as suitable means to cause the lubrication of the parts and to collect excess oil and grease so as to insure the smooth running of the mechanism preventing the possibility of oil or other foreign matter to accidentally fall on the bottles or on the hood caps. In addition, it should be noted that due to the particular correlation and coordination of the number of magazines or cap retaining means with the simultaneously actuated cap withdrawing elements I have materially simplified the loading of the retaining means 10 and 11 by the operator as the caps will be exhausted at the same time in each magazine so that the simultaneous loading of the magazines can be effected by the operator.

It is apparent that, within the scope of the invention, modifications and different arrangements may be made other than is herein disclosed, and the present disclosure is illustrative merely, the invention comprehending all variations thereof.

What I claim is:

1. In combination, a common receiving chute having a single outlet, a plurality of magazines, each adapted to retain a plurality of hood caps to be delivered to said receiving chute; a source of normally reduced pressure including a continuous suction means; a reciprocable member; means carried by said member adapted to be brought into simultaneous engagement with the next hood cap in each magazine to be delivered from said magazines; means associated with said member for connecting said source of normally reduced pressure simultaneously to said hood cap engaging means when the latter are in engagement with said hood caps to cause extracting engagement thereof; means to move said member away from said magazines while said hood cap engaging means are in extracting engagement to withdraw the same from the magazines; means coacting with said hood cap engaging means for releasing said hood caps; means for delivering containers adjacent said chute; and means actuated by a container to release a hood cap from said chute.

2. In combination, a common chute, a plurality of magazines, each adapted to retain a plurality of hood caps to be delivered to said common chute; a source of normally reduced pressure including a continuous suction means; a reciprocable member; a plurality of flexible elements carried by said member adapted to be brought into simultaneous engagement with the next hood cap in each magazine to be delivered from said magazines; means associated with said member for connecting said source of normally reduced pressure simultaneously to said flexible elements when the latter are in engagement with said hood caps to cause extracting engagement thereof; means to move simultaneously the flexible elements away from said magazines while in engagement with said hood caps to withdraw the same from the magazines; means for disconnecting said source of reduced pressure from said flexible elements for simultaneously releasing said hood caps; means for delivering containers adjacent said chute; and means actuated by a container to release a hood cap from said chute.

3. In combination, a common chute, a plurality of article retaining means, each adapted to retain a plurality of articles to be delivered to said common chute; a source of normally reduced pressure including a continuous suction means; a movable member; means carried by said member adapted to be brought into simultaneous engagement with the next article in each article retaining means to be delivered from said retaining means; means for connecting said source of normally reduced pressure simultaneously to said article engaging means when the latter are in engagement with said articles to cause extracting engagement thereof; means to move said member away from said article retaining means while said article engaging means are in extracting engagement to withdraw simultaneously articles from said retaining means; means for rendering ineffective the connection between said reduced pressure source and said article engaging means for simultaneously releasing said articles; means for delivering containers adjacent said chute; means actuated by a container to release an article from said chute; and means controlled by the articles in said chute for rendering said article engaging means ineffective.

4. In combination, a common chute, a plurality of means for retaining articles to be delivered in spaced relation to said common chute; movable means positioned adjacent to said retaining means adapted to be brought into simultaneous engagement with the next article in each retaining means to be delivered from said retaining means; a source of normally reduced pressure, including a continuous suction means; means operable to establish a connection between said source and said movable means to effect the simultaneous removal of the plurality of articles engaged by said movable means; means to render said connection ineffective for releasing simultaneously said articles after their removal from said retaining means; and means in said chute for rendering said movable means ineffective.

5. In combination, means for retaining independent supplies of articles to be delivered; a common serving chute having a single outlet for receiving said articles; article engaging means associated with said retaining means operable for simultaneously withdrawing one article from each of said independent supplies; mechanism operable to move away from said article retaining means towards said serving chute said article engaging means while the latter is in engagement with said articles; means operable to release simultaneously said articles on said serving chute; means controlled by the number of articles in said serving chute for rendering said movable article engaging means ineffective; means for delivering containers adjacent said chute; means for spraying and washing the mouth and neck of said containers; means to accelerate the drying of said washed parts of said containers; and means actuated by a container to release an article from said serving chute outlet.

6. In combination, means for retaining independent supplies of articles to be delivered; a receiving device for said articles having dual receiving inlets and a single serving outlet; article engaging means adjacent to said supplies; a mechanism for moving said article engaging means into extracting engagement with the next article to be delivered from each of said independent supplies and transporting said articles simultaneously to said receiving device; means operable to release said articles from said engaging means when the latter reaches a position to deposit said articles on said receiving device and means controlled by the number of articles in said receiving device for rendering said article transporting means ineffective.

7. In combination, a plurality of article retaining means, each adapted to temporarily hold a plurality of articles to be delivered; a receiving device for said articles having a single serving outlet; article engaging means adjacent to said retaining means; a mechanism for moving said article engaging means into extracting engagement with one article from each of said retaining means and transporting said articles simultaneously to said receiving device; means operable to release said articles simultaneously from said engaging means to deposit the same on said receiving device; and means associated with said receiving device to guide said simultaneously deposited articles in alternate sequence to said serving outlet.

8. In combination, means for retaining independent supplies of articles to be delivered; a receiving device for said articles having a single serving outlet; a mechanism for extracting the next article to be delivered from each of said independent supply and transporting said articles simultaneously to said receiving device; and means associated with said receiving device for guiding the simultaneously transported articles in alternate sequence to said single serving outlet.

9. In combination, a plurality of article retaining means, each adapted to temporarily hold a plurality of articles to be delivered; a receiving device for said articles having a single serving outlet; article engaging means adjacent to said retaining means; means movable between said retaining means and said receiving device; said movable means being operable in one position into extracting engagement with one article located in each of said retaining means for transporting said articles simultaneously from said retaining means to said receiving device; said movable means operable in its other position to release said articles simultaneously to deposit the same on said receiving device; and means associated with said receiving device for guiding the simultaneously deposited articles in alternate sequence to said serving outlet.

10. In combination, means for retaining independent supplies of articles to be delivered; a receiving device for said articles having a dual inlet and a single serving outlet; article engaging means adjacent to said supplies; means for moving said article engaging means into contacting engagement with the next article to be delivered from each of said indepenednt supplies, pneumatic means effective at the time of contact of said article engaging means with said article to cause an extrusion of air from said article engaging means for transporting said articles simultaneously to said receiving device when said article engaging means are moved away from said retaining means; a member having an opening to the atmosphere adapted to register with the article engaging means to admit air, and means operable to release said articles from said article engaging means when the latter reaches a position to deposit said articles on said receiving device.

11. In combination, a plurality of article retaining means, each adapted to temporarily hold a plurality of articles to be delivered; a receiving device for said articles having a single serving outlet; article engaging means adjacent to said retaining means; means for moving said article engaging means into contacting engagement with one article located in each of said retaining means; means effective at the time of contact of said article engaging means with said articles to cause an extracting engagement of said means with said articles for transporting said articles simultaneously from said retaining means to said receiving device; and means operable to release said articles simultaneously from said engaging means to effect the deposit of said articles on said receiving device; and means to guide the deposited articles on said receiving device in alternate sequence to said serving outlet.

12. In combination, a pair of magazines for retaining independent supplies of hood caps for bottles; a device adapted to receive the hood caps removed from said magazines provided with a single discharge outlet; means adapted to contact simultaneously each of the lowermost hood caps of said magazines; pneumatic means effective at the time of contact of said engaging means with said hood caps to cause the extrusion of air from said engaging means; means for moving said engaging means and hood caps in engagement therewith from said magazines; means for releasing said hood caps from said hood cap engaging means to simultaneously deposit said hood caps on said device; and means dependent upon the number of hood caps in said device for rendering the extrusion of air from hood cap engaging means ineffective.

13. In an apparatus for feeding articles, in combination, a plurality of magazines each retaining a stack of articles to be delivered; a plurality of suction cups for withdrawing the next article to be delivered from each stack; a reciprocating carrier on which said cups are mounted; passages formed on said carrier having communication with said cups and adapted for registration with a conduit connected with a source of vacuum; a valve interposed between said conduit and said source; a cam riding element connected to said valve; a rotatable cam for moving said element on the latter part of the up stroke of the carrier to cause the valve to move into a position to set up communication between the source and said conduit; and a normally stationary member having an opening to the atmosphere adapted to be in registration with said passages on the withdrawing stroke of the carrier to set up communication between the cups and atmosphere to effect the simultaneous release of the articles engaged by said cups when the carrier is substantially approaching the end of its withdrawing stroke.

14. In combination, means for retaining articles to be delivered; reciprocating carrier having a suction cup adapted to be brought into engagement with the next article to be delivered from said retaining means; a continuously actuated source of normally reduced pressure; a valve mechanism interposed between said source and said reciprocating carrier; a timing cam operating said valve mechanism for establishing a connection between said source and said reciprocating carrier when said suction cup is in engagement with said article to effect its removal by the application of reduced pressure to said suction cup and after the removal of said article from said retaining means for rendering said connection ineffective; and means for releasing the article engaged thereby.

15. In an apparatus for transporting articles, in combination, means for retaining a stack of hood caps to be delivered; a receiving device for said hood caps; a suction cup for withdrawing the next hood cap to be delivered from said stack; a reciprocating carrier on which said cup is mounted; a passage formed on said carrier having communication with said cup and adapted to be connected with a source of vacuum to cause an extracting engagement with a hood cap for transporting the same to the said receiving device; a valve interposed between said carrier and the source of vacuum; a cam riding element connected to said valve; a movable cam for moving said element on the latter part of the up stroke of the carrier to cause the valve to move into a position to set up communication between the source and said carrier; an arm connected with said cam riding element operable by a predetermined number of hood caps in said receiving device for holding said valve through said element in a position where no communication is set up between the source and said carrier to effect an extracting engagement of said cup with said hood caps.

16. In combination, a plurality of article retaining means, each adapted to temporarily hold a plurality of articles to be delivered; a receiving device for said articles; a pair of passages connected to a single serving conduit; article engaging means; a mechanism for moving said article engaging means into extracting engagement with one article from each of said retaining means for transporting said articles simultaneously to said receiving device; means operable to release said articles from said engaging means to deposit the same simultaneously on said passages; one of said passages being in substantial alignment with said serving conduit; and the other passage angularly displaced with respect to said serving conduit whereby the simultaneously deposited articles in said passages are guided in alternate sequence to said serving conduit.

17. In combination, means for retaining independent stacks of hood caps; a plurality of suction applying cups adapted to engage simultaneously with the lowermost hood cap in each stack to be delivered therefrom; a reciprocating carrier on which said cups are mounted; means for setting up communication between the cups and a source of vacuum on the withdrawing stroke of the carrier and between the cups and atmosphere after the cups have withdrawn a plurality of hood caps; and a plurality of conduits for receiving in separate relation the withdrawn hood caps and for transferring the same to a common delivery passage, one of said conduits being shorter than the other and in substantial axial alignment with said delivery passage for causing the hood caps received in said conduits to be transferred in alternate sequence to said delivery passage.

18. In combination, a pair of magazines each retaining a stack of articles to be delivered; a receiving device for said articles having a pair of spaced passages connected to a single delivery chute; a pair of suction cups for withdrawing the next article to be delivered from each stack to said passages; a reciprocating carrier on which said cups are mounted; a passage formed on said carrier having one end in communication with said cups; a conduit connected with a source of vacuum; a valve interposed between said conduit and said source; means to cause the valve to move into a position to set up communication between the source and said conduit on the latter part of the up stroke of said carrier; a member having an opening to the atmosphere adapted to be in registration with one end of the passage formed on said carrier to set up communication between the cups and atmosphere to effect the simultaneous release of the articles on the spaced passages of said receiving device; and means responsive to a predetermined number of articles in said delivery chute for moving the valve to render the communication between the source and said conduit ineffective.

19. In combination, a plurality of magazines for retaining in spaced relation stacks of hood caps; a reciprocable member located adjacent to said magazines; a plurality of flexible elements associated with said member; means to produce a source of normally reduced pressure, including a continuous suction means; means associated with said member for intermittently connecting said source of normally reduced pressure with said flexible elements for engaging simultaneously the lowermost hood cap from each of said magazines; means to move said member with respect to said magazines; means in the path of movement of said member cooperating to release each of said hood caps simultaneously from said flexible members upon disconnection of said normally reduced pressure; and a receiving device for said caps having a plurality of receiving inlets and a single serving outlet.

20. In a device of the character disclosed, in combination, a plurality of means for retaining a supply of articles; a common receiving chute for retaining a plurality of articles and having a single discharge opening for said articles; a plurality of article engaging means whereby articles from said retaining means are simultaneously removed from said retaining means and delivered simultaneously to said receiving chute; a common source of power for driving said article engaging means; means controlled by the number of articles in said chute for rendering said article engaging means ineffective; means for delivering containers adjacent said chute; means for spraying and washing the mouth and neck of said containers; means for drying said washed containers; and means actuated by a container to release an article from said chute outlet.

CHRISTIAN H. BRINTON.